United States Patent Office 3,294,868
Patented Dec. 27, 1966

3,294,868
POLYPROPYLENE BLENDED WITH BUTADIENE-STYRENE BLOCK COPOLYMER
James E. Pritchard, Bartlesville, Okla., assignor to Phillips Petroleum Company, a corporation of Delaware
No Drawing. Filed May 4, 1964, Ser. No. 364,828
2 Claims. (Cl. 260—876)

This invention relates to a modified polypropylene resin. In one aspect, the invention relates to a polypropylene blend.

Polypropylene resins and methods for their production are now well known in the art. An example of a crystalline polypropylene resin and the production thereof are described in British Patent 940,178. Crystalline polypropylene is a desirable molding resin in view of its high heat resistance, low density, high hardness, resistance to stress cracking, chemical inertness, and low tendency of injection-molded articles produced therefrom to warp. Polypropylene also has good impact strength at ordinary atmospheric temperature, i.e. 70° F. and above. However, at temperatures below 32° F., the impact strength of crystalline polypropylene decreases markedly as temperature decreases.

The problem of low impact strength has been approached in the prior art by blending, with the crystalline polypropylene, other resins, such as polyisobutylene and amorphous copolymers of ethylene and propylene, which are vulcanizable to form rubber-like materials. While this approach has been partially successful in improving impact strength, it has also had the undesirable effect of decreasing the flexural modulus of the polypropylene to an undesired extent.

An object of this invention is to produce an improved polypropylene blend. Another object of the invention is to improve the impact strength of polypropylene with concomitant minimized decrease in the flexural modulus. Other objects and advantages will become apparent to those skilled in the art on reading this disclosure.

I have found that the impact strength of crystalline polypropylene can be markedly increased and, at the same time, decrease in flexural modulus minimized by blending with the polypropylene a block copolymer of butadiene and styrene.

The methods of blending in accordance with my invention are those generally known in the prior art for blending resinous or polymeric materials. These methods include kneading, roll milling, blending in a Banbury mill, melting the ingredients to be blended and mixing the molten ingredients, and dissolving the ingredients in suitable solvents, such as toluene or any of the xylenes, mixing the solutions, and recovering the dissolved polymers as a blend by vaporizing the solvent or by precipitating the dissolved mixture, for example by the addition of an antisolvent such as a ketone or an alcohol. The amount of block copolymer added in accordance with my invention is within the range 3 to 35 weight percent based on the total weight of polypropylene plus block copolymer. Maximum improvement is generally obtained when the amount of block copolymer is in the range 5 to 20 weight percent.

Polypropylenes to which my invention is applicable are those having a density in the range 0.900 to 0.920, a flexural modulus in the range 100,000 to 250,000, and a melt flow in the range 1 to 15.

The block copolymers utilized in accordance with my invention are described in British Patent 888,624. The materials used in accordance with my invention contain from 10 to 30 percent of bound styrene, at least 80 percent of which is present in the form of a homopolymeric polystyrene block. The determination of the bound styrene content and the styrene homopolymer block are described in the cited British patent. The inherent viscosity of the block copolymers used in accordance with this invention is within the range 0.1 to 2.

The following is a specific embodiment of my invention:

Crystalline polypropylene was blended with a butadiene-styrene block copolymer containing approximately 25 percent total bound styrene, approximately 80 percent of the total bound styrene being present in a homopolymer block, as determined by oxidative degradation. The polymers were blended on a 6-inch roll mill at 350° F. for 10 minutes following preliminary mixing. The blends were stabilized by addition of 0.1 weight percent each of 4,4′-thiobis(6-tert-butyl-m-cresol) and dilaurylthiodipropionate. Properties of the resulting blends are shown in the following tabulation and compared with corresponding blends of the same polypropylene with a polyisobutylene (PIB) and an amorphous, peroxide-vulcanizable copolymer of ethylene and propylene (EPR).

| | | | | |
|---|---|---|---|---|
| Polypropylene, Wt. percent | 100 | 95 | 90 | 80 |
| Block Copolymer, Wt. percent | 0 | 5 | 10 | 20 |
| Flexural Modulus, 73° F., p.s.i. × $10^{-3}$ ᵃ | 220 | 177 | 167 | 136 |
| Impact Strength, 0° F., ft. lb.ᵇ | 2 | 5.6 | 6.5 | 24.9 |
| PIB, Wt. percent | 0 | 5 | 10 | 20 |
| Flexural Modulus, as Above | 220 | 158 | 144 | 130 |
| Impact Strength, as Above | 2 | 5.9 | 9.5 | 19.4 |
| EPR, Wt. percent | 0 | 5 | 10 | 20 |
| Flexural Modulus, as Above | 220 | 152 | 137 | 113 |
| Impact Strength, as Above | 2 | 4.6 | 6.5 | 14.9 |

ᵃ ASTM D 799–61.
ᵇ ASTM D 256–56, ½″ x ¼″ bar, no notch.

The foregoing data show that the impact strength improvement imparted by the block copolymer is at least as great as that imparted by the polyisobutylene and the ethylene-propylene rubbery copolymer, which are two of the better blending agents for this purpose known in the art. At the same time, the decrease of flexural modulus resulting from blending with the copolymer according to my invention was less than that obtained from the polyisobutylene and the ethylene-propylene copolymer. Thus I have produced a modified polypropylene having improved properties as an injection-molding resin.

For the determinations of properties indicated in the foregoing tabulation, test specimens were prepared by using a Moslo molding machine. A mold temperature of 140° F., a cylinder and nose temperature of 500° F., a cycle time of 45 seconds, an injection time of 20 seconds, a booster time of 2 seconds, a cooling time of 18 seconds, and a 5-second "mold open" time were used.

The polypropylene used in the foregoing tests had a density of 0.906 gm./cc. at 25° C. and a melt flow of 3.6 (ASTM D1238–57T, 230° C.).

The polyisobutylene had a molecular weight in the range 64,000 to 81,000, based on viscosity determination (Studinger method described by Flory, J. American Chemical Society 65, 372–382, FIGURE 4, 1943). The ethylene-propylene copolymer had a density of 0.856 gm./cc. at 25° C. and a Mooney viscosity of 40 (ML–8 at 212° F., ASTM D1646–61).

It is within the scope of this invention to incorporate, into the blends described, various additives known in the art, e.g. pigments, fillers, foaming agents, antioxidants, absorbers of actinic light, and/or other additives as desired.

I claim:
1. A blend of polypropylene and a block copolymer of butadiene and styrene, said blend comprising from 3 to

35 weight percent of said block copolymer and the remainder crystalline polypropylene; said polypropylene having a density in the range 0.900 to 0.920, a flexural modulus in the range 100,000 to 250,000, and a melt flow in the range 1 to 15; said block copolymer containing from 10 to 30 weight percent bound styrene, at least 80 percent of which is in the form of a homopolymeric polystyrene block, as determined by oxidative degradation, and an inherent viscosity in the range 0.1 to 2.

2. A blend according to claim 1 wherein the block polymer content is in the range 5 to 20 weight percent.

References Cited by the Examiner

UNITED STATES PATENTS 2,910,451  10/1959  Cantwell _____ 260—889

FOREIGN PATENTS 856,793  12/1960  Great Britain.
888,624  1/1962  Great Britain.

MURRAY TILLMAN, *Pirmary Examiner.*

G. F. LESMES, *Assistant Examiner.*